US012564964B2

(12) United States Patent
Li et al.

(10) Patent No.: US 12,564,964 B2
(45) Date of Patent: Mar. 3, 2026

(54) ADAPTIVE NAVIGATION USING ARTIFICIAL INTELLIGENCE FOR ENHANCING TASK PERFORMANCE IN AUTONOMOUS ROAMING ROBOTIC DEVICES

(71) Applicant: International Business Machines Corporation, Armonk, NY (US)

(72) Inventors: Jenny S. Li, Franklinton, NC (US); Nirmit V Desai, Yorktown Heights, NY (US); Dhiraj Joshi, Edison, NJ (US); Raghu Ramaswamy, Bangalore (IN); Satish Rajani, Dewas (IN)

(73) Assignee: International Business Machines Corporation, Armonk, NY (US)

( * ) Notice: Subject to any disclaimer, the term of this patent is extended or adjusted under 35 U.S.C. 154(b) by 988 days.

(21) Appl. No.: 17/451,169

(22) Filed: Oct. 18, 2021

(65) Prior Publication Data

US 2023/0124038 A1      Apr. 20, 2023

(51) Int. Cl.
*B25J 9/16* (2006.01)
*B25J 13/00* (2006.01)
*G05D 1/00* (2006.01)

(52) U.S. Cl.
CPC ........... *B25J 9/1697* (2013.01); *B25J 13/006* (2013.01); *G05D 1/0022* (2013.01); *G05D 1/0221* (2013.01); *G05D 1/0246* (2013.01)

(58) Field of Classification Search
CPC ..... B25J 9/1697; B25J 13/006; G05D 1/0022; G05D 1/0221; G05D 1/0246;
(Continued)

(56) References Cited

U.S. PATENT DOCUMENTS 7,663,481 B2    2/2010  Kim
10,136,302 B2   11/2018  Hu
(Continued)

FOREIGN PATENT DOCUMENTS

EP          4419977 A1    8/2024
WO      2023/066771 A1    4/2023

OTHER PUBLICATIONS

International Search Report and Written Opinion, International Application No. PCT/EP2022/078463, International Filing Date: Oct. 13, 2022, Date of Mailing: Feb. 9, 2023, 16 pages.
(Continued)

*Primary Examiner* — Nhi Q Bui
(74) *Attorney, Agent, or Firm* — Michael A. Petrocelli

(57)          ABSTRACT

Optimizing sensing capabilities of a roaming robotic device using Artificial Intelligence (AI) includes receiving data at a control system having a computer from a robotic device. The control system communicating a policy to the robotic device for choosing navigation actions for the robotic device. The received data is analyzed using the control system for determining when the received data meets a threshold for determining quality of the data. The analysis can include generating a model based on the received data where the model includes vector representation of inputs detected by a sensor array at the location. In response to the received data at the control system not meeting the threshold for determining quality, the robotic device communicating with the control system to collaborate in updating the policy to choose a next action.

19 Claims, 9 Drawing Sheets

(58) Field of Classification Search
CPC .. G05D 1/0088; G05D 1/0094; G05D 1/0217;
G05D 1/0297
See application file for complete search history.

(56) References Cited

U.S. PATENT DOCUMENTS

| 10,455,462 | B1 | 10/2019 | Desai | |
|---|---|---|---|---|
| 10,618,168 | B2 * | 4/2020 | Gros | G05B 19/042 |
| 11,082,525 | B2 | 8/2021 | Sethuraman | |
| 2012/0170474 | A1 | 7/2012 | Pekarske | |
| 2015/0190925 | A1 * | 7/2015 | Hoffman | B25J 9/161 |
| | | | | 901/47 |
| 2017/0048308 | A1 | 2/2017 | Qaisar | |
| 2018/0016780 | A1 | 1/2018 | Cotter | |
| 2019/0053148 | A1 | 2/2019 | Lee | |
| 2019/0188473 | A1 * | 6/2019 | Witt | G06V 20/64 |
| 2019/0281132 | A1 | 9/2019 | Sethuraman et al. | |
| 2020/0073401 | A1 * | 3/2020 | Szatmary | B60T 7/00 |
| 2020/0156242 | A1 * | 5/2020 | Imai | B25J 9/163 |
| 2020/0177671 | A1 | 6/2020 | Tofighbakhsh | |
| 2020/0327371 | A1 | 10/2020 | Sharma | |
| 2021/0210217 | A1 | 7/2021 | Xu | |
| 2021/0232136 | A1 | 7/2021 | Griffin | |
| 2021/0243260 | A1 | 8/2021 | Bhaumik | |
| 2021/0256424 | A1 * | 8/2021 | Rajkumar | B25J 9/163 |
| 2021/0278257 | A1 * | 9/2021 | Dharia | G01S 17/89 |

OTHER PUBLICATIONS

Minovski et al., "Modeling Quality of IoT Experience in Autonomous Vehicles", IEEE Internet of Things Journal, vol. 7, No. 5, May 5, 2020, 18 pages.
Yuhas et al., "Embedded Out-of-Distribution Detection on an Autonomous Robot Platform", Destion '21, May 18, 2021, arXiv:2106. 15965v1, Jun. 30, 2021, 6 pages.
An, et al., "EiF: Toward Elastic IoT Fog Framework for AI Services", IEEE Communications Magazine, vol. 57 Issue: 5, May 2019, 7 pages, <https://ieeexplore.IEEE.org/document/8713796>.

Chen, et al., "Real-Time Object Tracking on a Drone With Multi-Inertial Sensing Data", IEEE Transactions On Intelligent Transportation Systems, vol. 19, No. 1, Jan. 2018, pp. 131-139, <https://ieeexplore. eee.org/document/8054712>.
Christopoulos, et al., Adaptive Sensing for Instantaneous Gas Release Parameter Estimation, Proceedings of the 2005 IEEE International Conference on Robotics and Automation, 7 pages, <https://citeseerx. ist.psu.edu/viewdoc/summary?doi=10.1.1.125.5925>.
Deng, et al., "Edge Intelligence: The Confluence of Edge Computing and Artificial Intelligence", arXiv:1909.00560v2, Feb. 10, 2020, 13 pages.
Knudson, et al., "Adaptive navigation for autonomous robots", Robotics and Autonomous Systems, vol. 59, Issue 6, Jun. 2011, 32 pages.
Lee, et al., "NeuralFP: Out-of-distribution Detection using Fingerprints of Neural Networks", 2020 25th International Conference on Pattern Recognition (ICPR), pp. 9561-9568, <https://ieeexplore. ieee.org/document/9412489>.
Liu, et al., "Client-Edge-Cloud Hierarchical Federated Learning", arXiv:1905.06641v2, Oct. 31, 2019, 6 pages.
Loven, et al., "EDISON: An Edge-Native Method and Architecture for Distributed Interpolation", Sensors 2021, 21, 2279, 20 pages, <https://doi.org/10.3390/s21072279>.
Mell, et al., "The NIST Definition of Cloud Computing", National Institute of Standards and Technology, Special Publication 800-145, Sep. 2011, 7 pages.
Sanderson, et al., "Adaptive Visual Servo Control of Robots", In: Pugh A. (eds) Robot Vision. International Trends in Manufacturing Technology, 1983, Abstract only, pp. 107-116, <https://link.springer. com/chapter/10.1007%2F978-3-662-09771-7_7>.
Xu, et al., "Edge Intelligence: Architectures, Challenges, and Applications", arXiv:2003.12172v2, Jun. 12, 2020, 53 pages.
Zhou, et al., "Working towards Adaptive Sensing for Terrain-aided Navigation", 2019 International Conference on Robotics and Automation (ICRA), 8 pages, <https://www.researchgate.net/publication/ 335140925_Working_towards_Adaptive_Sensing_for_Terrain-aided_ Navigation>.

* cited by examiner

100

200

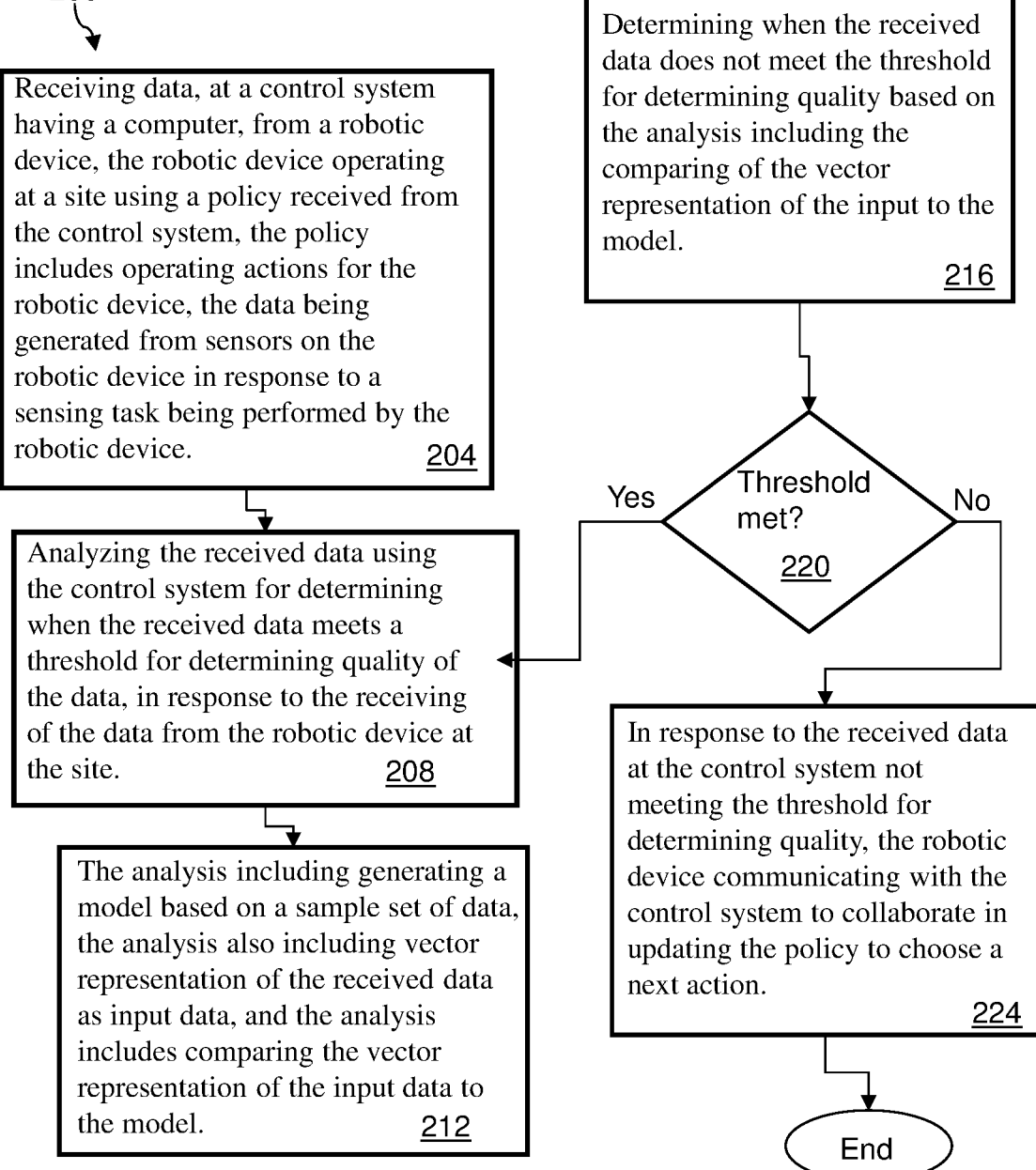

Receiving data, at a control system having a computer, from a robotic device, the robotic device operating at a site using a policy received from the control system, the policy includes operating actions for the robotic device, the data being generated from sensors on the robotic device in response to a sensing task being performed by the robotic device.                          204

Analyzing the received data using the control system for determining when the received data meets a threshold for determining quality of the data, in response to the receiving of the data from the robotic device at the site.                          208

The analysis including generating a model based on a sample set of data, the analysis also including vector representation of the received data as input data, and the analysis includes comparing the vector representation of the input data to the model.                          212

Determining when the received data does not meet the threshold for determining quality based on the analysis including the comparing of the vector representation of the input to the model.                          216

Threshold met?
Yes          No
220

In response to the received data at the control system not meeting the threshold for determining quality, the robotic device communicating with the control system to collaborate in updating the policy to choose a next action.                          224

End

FIG. 2

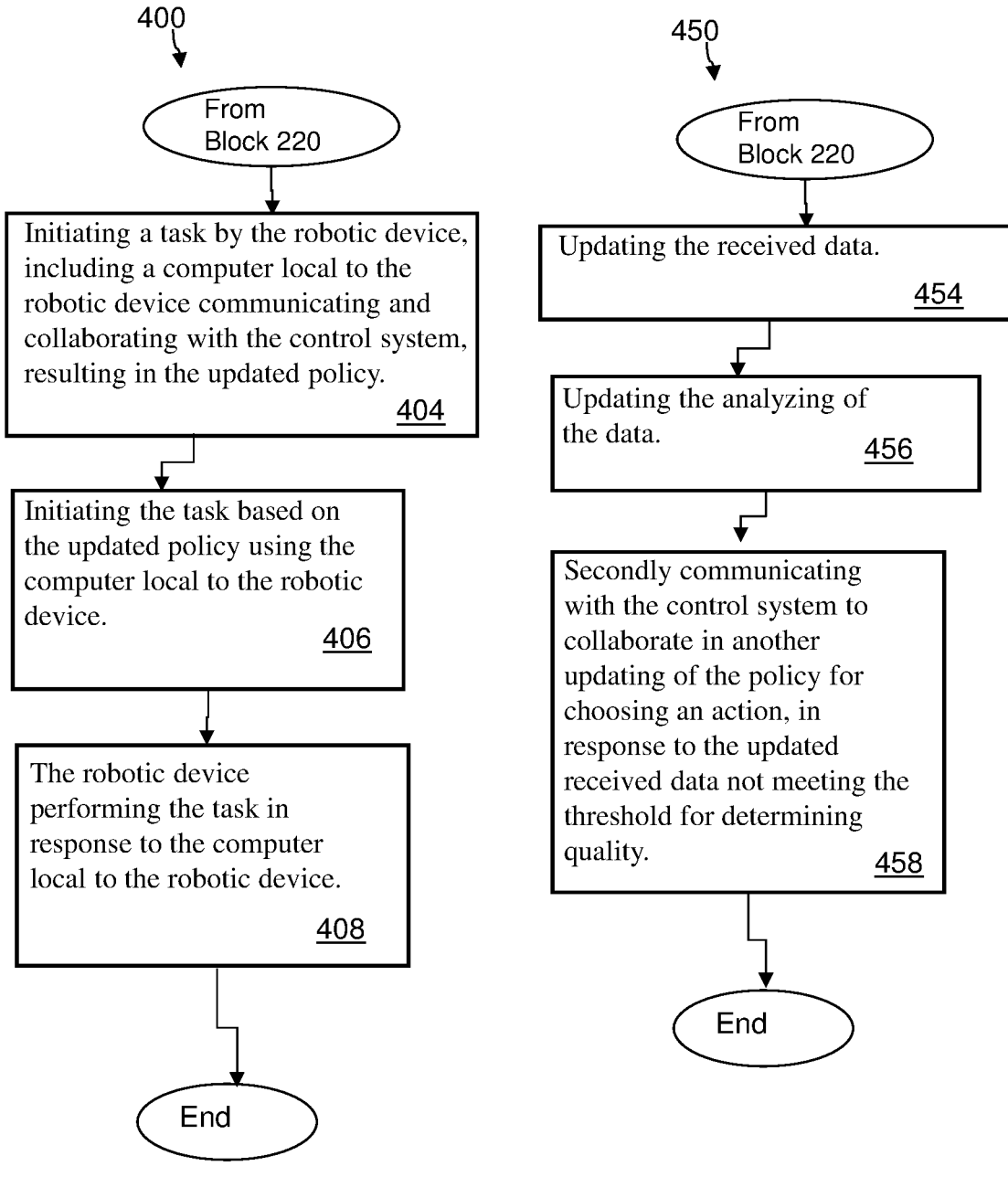

400

From
Block 220

Initiating a task by the robotic device,
including a computer local to the
robotic device communicating and
collaborating with the control system,
resulting in the updated policy.

404

Initiating the task based on
the updated policy using the
computer local to the robotic
device.

406

The robotic device
performing the task in
response to the computer
local to the robotic device.

408

End

From
Block 220

Updating the received data.

454

Updating the analyzing of
the data.

456

Secondly communicating
with the control system to
collaborate in another
updating of the policy for
choosing an action, in
response to the updated
received data not meeting the
threshold for determining
quality.

458

End

FIG. 4B

ADAPTIVE NAVIGATION USING ARTIFICIAL INTELLIGENCE FOR ENHANCING TASK PERFORMANCE IN AUTONOMOUS ROAMING ROBOTIC DEVICES

BACKGROUND

The present disclosure relates to Artificial Intelligence (AI) enabled adaptive navigation for enhancing task performance for an autonomous roaming robotic device, and more specifically, optimizing sensing capabilities for a roaming edge device.

In one example, operations across industries can use instruments with Internet of Things (IoT) devices and sensors embedded in various equipment and location to monitor and assess processes. Using analytics and machine learning techniques, data collected from such connected operations using sensors can be analyzed to assist decision making, automation, and efficiency for processes and for making business decisions. However, in many environments, the equipment is mission-critical, having legacy technology, or too costly to instrument, e.g., nuclear power plants, large chemical furnaces, or large power grid stations. In such environments, having a robotic device such as a roaming edge device (RED) with versatile sensing ability may be a cost-effective solution. Instead of deploying a large number of sensors in legacy equipment or replacing legacy equipment, a small number of REDs can be mobile in the environment autonomously to sense the operational situations and collect important operational data that can be analyzed.

However, in such scenarios, data collected and received from sensors via the REDs can be less than optimal, subpar, poor quality. Such poor quality data can include, for example, data that is corrupted, or distorted, or has a low Signal-to-Noise Ratio.

SUMMARY

The present disclosure recognizes the shortcomings and problems associated with current techniques for Artificial Intelligence (AI) enabled adaptive navigation for enhancing task performance for an autonomous roaming robotic device, and more specifically, optimizing sensing capabilities for a mobile robotic device, e.g., a roaming edge device (RED). The present invention can include a robotic device or RED acting outside a scope of an original plan or policy to initiate an updated plan or policy to improve the quality of the data collection. In such scenarios where a RED is in a location for collecting data, noise and variability in sensed information can be caused by many factors in the operational environment. In one example, the dynamic nature of the operational environment can lead to low quality sensed data. Unlike fixed sensors embedded in the environment, e.g., CCTV cameras, the physical navigation of a RED carrying the sensors may introduce errors in positioning and orientation of sensors. Further, the position and orientation of the objects in the environment may also change over time, e.g., number and sizes of boxes in a warehouse. The operational status of the equipment in the environment may change based on production plans, e.g., initialization of a processes, steady state manufacturing, and ramp down. Any of the above variations in the environment can lead to poor quality of sensed information and low accuracy in downstream Artificial Intelligence (AI) based decision-making. The variations in the environment can be difficult to predict or plan for, and since the acceptable quality and nature of sensed information depends on the specific algorithms being used in the downstream AI pipeline, it can be difficult to ensure the quality of sensed information across multiple application scenarios and environments. For energy conservation, the downstream AI pipeline may reside outside of the RED on an edge or a Cloud server communication range, for example, over a WAN (Wide Area Network). Thus, the evaluation of the quality of sensed information may not happen on the RED and there may be constraints on the amount of raw data that may be shared with the edge or Cloud server due to the cost, latency, or sensitivity of raw data. Thereby the present invention addresses the challenge of accounting for the variations in the environment being sensed and dynamically adjusting the navigation of RED to optimize the sensing quality. Also, the present invention addresses scenarios where the RED may not have the ability to evaluate the quality of the sensed and collected data or information.

In an aspect according to the present invention, a computer-implemented method for optimizing sensing capabilities of a roaming robotic device using Artificial Intelligence (AI), includes receiving data, at a control system having a computer, from a robotic device. The robotic device operating at a site using a policy received from the control system, the policy includes operating actions for the robotic device, and the data is generated from sensors on the robotic device in response to a sensing task being performed by the robotic device. The method includes analyzing the received data using the control system for determining when the received data meets a threshold for determining quality of the data, in response to the receiving of the data from the robotic device at the site. The method includes the analysis including generating a model based on a sample set of data, the analysis also including vector representation of the received data as input data, and the analysis includes comparing the vector representation of the input data to the model. The method includes determining when the received data does not meet the threshold for determining quality based on the analysis including the comparing of the vector representation of the input to the model. The method includes, in response to the received data at the control system not meeting the threshold for determining quality, the robotic device communicating with the control system to collaborate in updating the policy to choose a next action.

In a related aspect, the next action includes a navigation action including the robotic device moving to a next location in the site and initiating additional data collection by the robotic device for the sensing task.

In a related aspect, the next action includes the robotic device adjusting a camera on the robotic device.

In a related aspect, the next action is selected from a group consisting of: moving to a next location; adjusting a camera on the robotic device; adjusting a sensor on the robotic deice; and waiting for a period of time.

In a related aspect, the method includes creating an out of distribution detector (OOD) from the sample set of data to determine a distance between the distribution of data in the sample set of data, and the input data; and using the distance in the determining when the received data does not meet the threshold for determining quality.

In a related aspect, the robotic device is a roaming edge device (RED) located at an edge of communications for roaming edge devices at the site.

In a related aspect, the threshold for determining quality includes a measured level of electronic noise which is acceptable for quality and thereby when the received data exceeds the threshold, the received data is unacceptable in relation to quality.

In a related aspect, the method includes updating the model, using the computer; the updated model includes the following; updating the received data; updating the analyzing of the data; and secondly communicating with the control system to collaborate in another updating of the policy for choosing navigation action, in response to the updated received data not meeting the threshold for determining quality.

In a related aspect, the method includes iteratively generating the model to produce updated models.

In a related aspect, the site where the robotic device is operating has low quality electronic wireless communication capabilities.

In a related aspect, the method further including receiving data at the control system from the robot; and the received data at the control system meeting the threshold for determining quality of the data.

In a related aspect, the robotic device communicates with the control system at least in part as a cloud server to collaborate in updating the policy to choose a navigation action, and the cloud server being in communication with the robot at the location.

In another aspect according to the present invention, a system using a computer for optimizing sensing capabilities of a roaming robotic device using Artificial Intelligence (AI), includes a computer system. The computer system includes; a computer processor, a computer-readable storage medium, and program instructions stored on the computer-readable storage medium being executable by the processor, to cause the computer system to perform the following functions to; receive data, at a control system having a computer, from a robotic device, the robotic device operating at a site using a policy received from the control system, the policy includes operating actions for the robotic device, the data being generated from sensors on the robotic device in response to a sensing task being performed by the robotic device; analyze the received data using the control system for determining when the received data meets a threshold for determining quality of the data, in response to the receiving of the data from the robotic device at the site; generate a model, as part of the analysis, based on a sample set of data, the analysis also including vector representation of the received data as input data, and the analysis includes comparing the vector representation of the input data to the model; determine when the received data does not meet the threshold for determining quality based on the analysis including the comparing of the vector representation of the input to the model; and in response to the received data at the control system not meeting the threshold for determining quality, the robotic device communicates with the control system to collaborate in updating the policy to choose a next action.

In a related aspect, the next action includes a navigation action including the robotic device moving to a next location in the site and initiating additional data collection by the robotic device for the sensing task.

In a related aspect, the next action includes the robotic device adjusting a camera on the robotic device.

In a related aspect, the next action is selected from a group consisting of: moving to a next location; adjusting a camera on the robotic device; adjusting a sensor on the robotic deice; and waiting for a period of time.

In a related aspect, the system includes creating an out of distribution detector (OOD) from the sample set of data to determine a distance between the distribution of data in the sample set of data, and the input data; using the distance in the determining when the received data does not meet the threshold for determining quality.

In a related aspect, the robotic device is a roaming edge device (RED) located at an edge of communications for roaming edge devices at the site.

In a related aspect, the threshold for determining quality includes a measured level of electronic noise which is acceptable for quality and thereby when the received data exceeds the threshold, the received data is unacceptable in relation to quality.

In an aspect according to the present invention, a computer program product for optimizing sensing capabilities of a roaming robotic device using Artificial Intelligence (AI), has the computer program product comprising a computer readable storage medium having program instructions embodied therewith, The program instructions executable by a computer to cause the computer to perform functions, by the computer, comprising the functions to; receive data, at a control system having a computer, from a robotic device, the robotic device operating at a site using a policy received from the control system, the policy includes operating actions for the robotic device, the data being generated from sensors on the robotic device in response to a sensing task being performed by the robotic device; analyze the received data using the control system for determining when the received data meets a threshold for determining quality of the data, in response to the receiving of the data from the robotic device at the site; generate a model, as part of the analysis, based on a sample set of data, the analysis also including vector representation of the received data as input data, and the analysis includes comparing the vector representation of the input data to the model; determine when the received data does not meet the threshold for determining quality based on the analysis including the comparing of the vector representation of the input to the model; and in response to the received data at the control system not meeting the threshold for determining quality, the robotic device communicates with the control system to collaborate in updating the policy to choose a next action.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

FIG. 2 is a flow chart illustrating a method, implemented using the system shown in FIG. 1, for optimizing sensing capabilities of a roaming robotic device using Artificial Intelligence (AI), according to an embodiment of the present disclosure.

FIG. 4A is a flow chart illustrating another method, which continues from the flow chart of FIG. 2, for optimizing sensing capabilities of a roaming robotic device using Artificial Intelligence (AI).

FIG. 4B is a flow chart illustrating another method, which continues from the flow chart of FIG. 2, for optimizing sensing capabilities of a roaming robotic device using Artificial Intelligence (AI).

DETAILED DESCRIPTION

The following description with reference to the accompanying drawings is provided to assist in a comprehensive understanding of exemplary embodiments of the invention as defined by the claims and their equivalents. The description includes various specific details to assist in that understanding, but these are to be regarded as merely exemplary, and assist in providing clarity and conciseness. Accordingly, those of ordinary skill in the art will recognize that various changes and modifications of the embodiments described herein can be made without departing from the scope and spirit of the invention. In addition, descriptions of well-known functions and constructions may be omitted.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

EMBODIMENTS AND EXAMPLES

Embodiments and figures of the present disclosure may have the same or similar components as other embodiments.

Such figures and descriptions of illustrate and explain further examples and embodiments according to the present disclosure.

Figure 1:
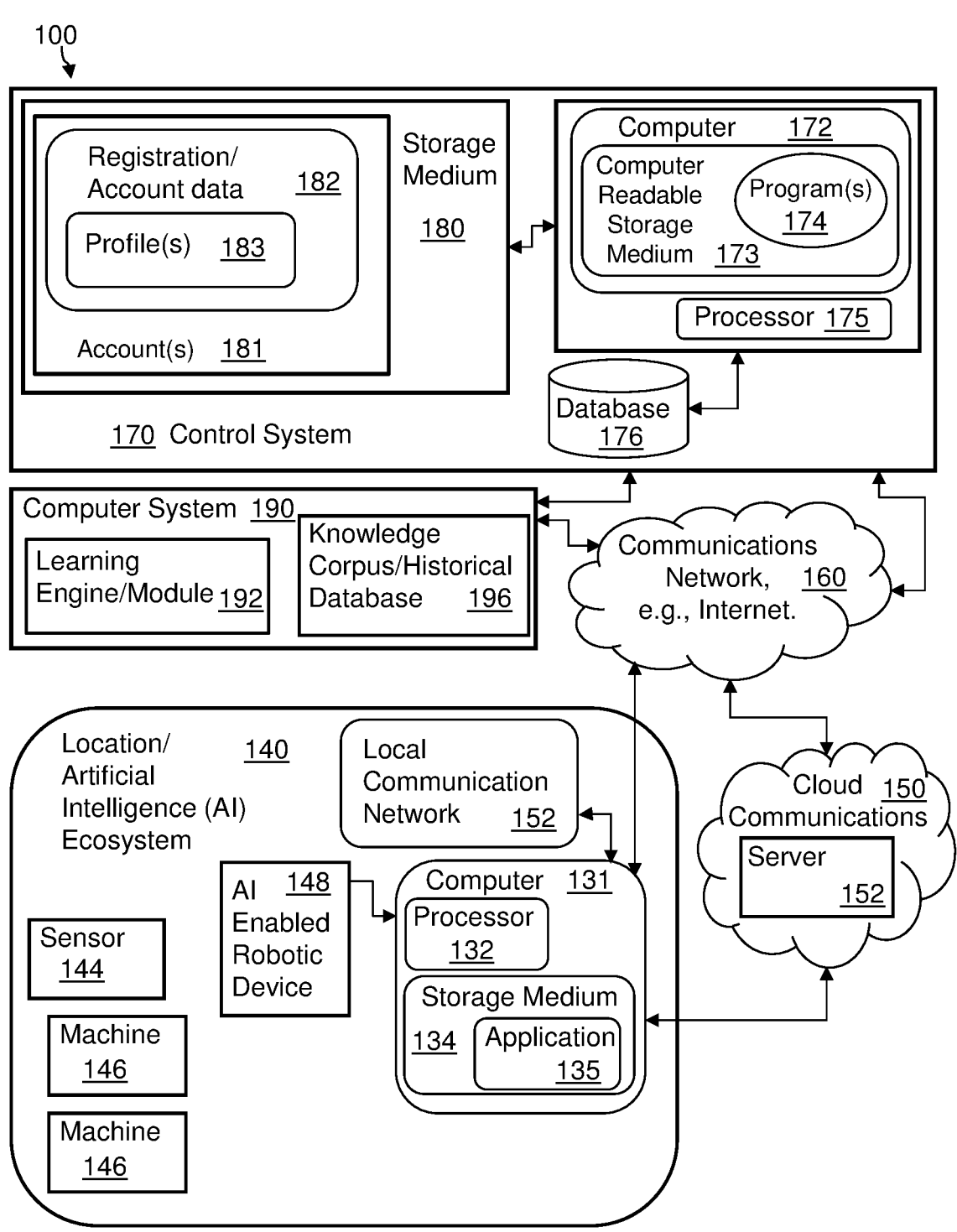
FIG. 1 is a schematic block diagram illustrating an overview of a system, system features or components, and methodology for optimizing sensing capabilities of a roaming robotic device using Artificial Intelligence (AI), according to an embodiment of the present disclosure.
Figure 3:
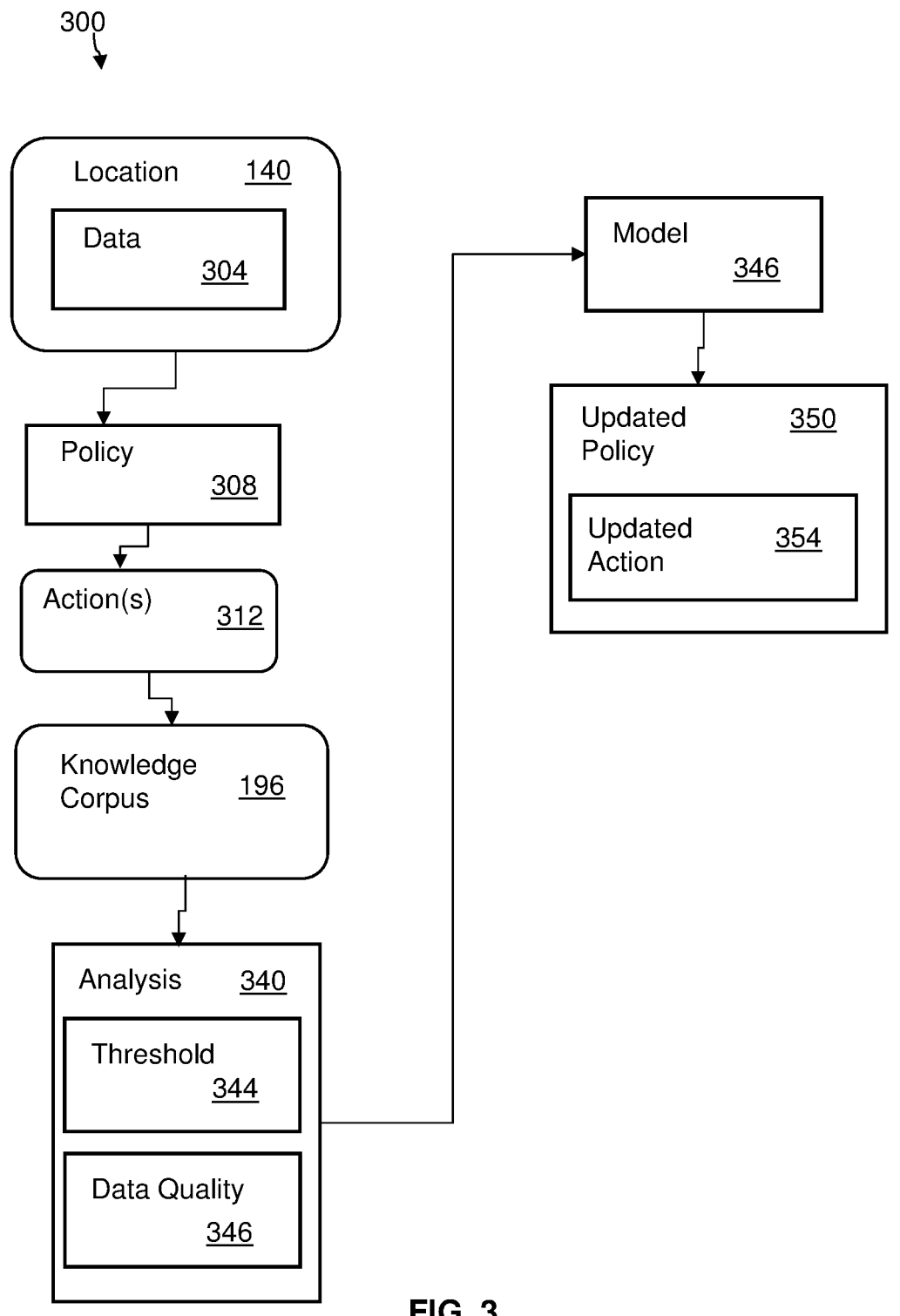
FIG. 3 is a functional schematic block diagram showing a series of operations and functional methodologies, for instructional purposes illustrating functional features of the present disclosure associated with the embodiments shown in the FIGS., which can be implemented, at least in part, in coordination with the system shown in FIG. 1, for optimizing sensing capabilities of a roaming robotic device using Artificial Intelligence (AI).

Referring to FIGS. 1, 2 and 3, according to embodiments of the present disclosure, a computer-implemented method 200 for optimizing sensing capabilities of a roaming robotic device using Artificial Intelligence (AI) includes features described below. Embodiments of the present disclosure include operational actions and/or procedures. The computer-implemented method 200 includes a series of operational blocks for implementing an embodiment according to the present disclosure which can include the system shown in FIG. 1. The operational blocks of the methods and systems according to the present disclosure can include techniques, mechanism, modules, and the like for implementing the functions of the operations in accordance with the present disclosure.

The method 200 includes receiving data 304 at a control system 170 having a computer 172 from a robotic device 148. The robotic device can operate at a site or location 140, and the control system can communicate a policy 308 to the robotic device 148 for choosing an action 312 (which can include a navigation action) for the robotic device, as in block 204. The control system can access a knowledge corpus or historical database 196 which can be part of a computer system 190 communicating with the control system 170. The AI enabled robotic device 148 can include a computer 131 having a processor 132 and storage medium 134 which can store an application 135, which can embody, in all or part, the operations of one or more methods of the present disclosure. The location can include a sensor 144 which represents one or more sensors or a sensor array, a machine 146 which is representative of one or more pieces of equipment, devices, or types of machines.

In one example, the location where the robotic device is operating has low quality electronic wireless communication capabilities. For instance, sub-optimal electronic wireless communication capabilities.

The computer 131 can be integral to or communicating with the robotic device 148 in a device 130. A computer 190 remote from the device 148 can electronically communicate, in all or in part, with the computer 172 as part of the control system 170. The control system can include the computer 172 having a computer readable storage medium 173 which can store one or more programs 174, and a processor 175 for executing program instructions. The control system can also include a storage medium which can include registration and/or account data 182 and profiles 183 of users or entities (such entities can include robotic entities) as part of user accounts 181. User accounts 181 can be stored on a storage medium 180 which is part of the control system 170. The user accounts 181 can include registrations and account data 182 and user profiles 183. The control system can also include a computer 172 having a computer readable storage medium 173 which can store programs or code embedded on the storage medium. The program code can be executed by a processor 175. The computer 172 can communicate with a database 176. The control system 170 can also include a database 176 for storing all or part of such data as described above, and other data.

The control system can also communicate with a computer system 190 which can include a learning engine/module 192 and a knowledge corpus or database 196. The computer system 190 can also communicate with the computer 131 of the device 130 and can be remote from the user device 130. In another example, the computer system 190 can be all or part of the control system, or all or part of the device 130. The depiction of the computer system 190 as well as the other components of the system 100 are shown as one example according to the present disclosure.

The new or different AI (Artificial Intelligence) ecosystem, or technology/communication or IT (Information Technology) ecosystem can include a local communications network 152 which can communicate with the communications network 160. The system 100 can include a learning engine/module 192, which can be at least part of the control system or communicating with the control system, for generating a model or learning model. In one example, the learning model can model workflow in a new AI or IT ecosystem for machine/devices in the new ecosystem.

In another example, the computer 131 can be part of a device 130. The computer can include a processor 132 and a computer readable storage medium 134 where an application 135 can be stored which can in one example, embody all or part of the method of the present disclosure. The application can include all or part of instructions to implement the method of the present disclosure, embodied in code and stored on a computer readable storage medium. The device 148 can include a display. The device 148 can operate, in all or in part, in conjunction with a remote server by way of a communications network 160, for example, the Internet. The method includes analyzing 340 the received data using the control system for determining when the received data meets a threshold 344 for determining quality 346 of the data, in response to the receiving of the data from the robotic device in the location or site, as in block 208.

The method includes the analysis including generating a model 346 based on a sample set of data, the analysis also including vector representation of the received data as input data, and the analysis includes comparing the vector representation of the input data to the model, as in block 212. The model can include vector representation of inputs detected by a sensor array 144 at the location, the inputs being at least part of the received data. A model can also be generated by an AI system such as an output at least in part of an AI system analysis using machine learning.

The method includes determining when the received data does not meet the threshold for determining quality based on the analysis including the comparing of the vector representation of the input to the model, as in block 216.

When the threshold is met at block 220, the method can return to block 208. When the threshold is not met, the method can continue to block 224.

The method includes, in response to the received data at the control system not meeting the threshold for determining quality, the robotic device communicating with the control system to collaborate in updating 350 the policy 308 to choose a next or updated action 354, as in block 224.

In one example, the next action includes a navigation action including the robotic device moving to a next location in the site and initiating additional data collection by the robotic device for the sensing task.

In another example, the next action includes the robotic device adjusting a camera on the robotic device.

In another example, the next action is selected from a group consisting of: moving to a next location; adjusting a camera on the robotic device; adjusting a sensor on the robotic deice; and waiting for a period of time.

In another example, the method can include creating an out of distribution detector (OOD) from the sample set of data to determine a distance between the distribution of data in the sample set of data, and the input data, and using the distance in the determining when the received data does not meet the threshold for determining quality.

In another example, the robotic device is a roaming edge device (RED) located at an edge of communications for roaming edge devices at the site.

In another example, the threshold for determining quality includes a measured level of electronic noise which is acceptable for quality and thereby when the received data exceeds the threshold, the received data is unacceptable in relation to quality.

In another example, a cloud server 152 using cloud communications 150 is communicable or communicating with the robot can have increased communication capabilities with the robot at the location in comparison to the control system. In another example, the method can include receiving data at the cloud system from the robot, and the received data as the cloud system meets the threshold for determining quality of the data.

In one example, as part of the analysis of received data including data in the knowledge corpus and historical database 196, which can be populated by historical data gathered from sensors, mobile robots, and machines.

In one example, the robotic device can be a roaming edge device (RED) located at an edge of communications for roaming edge devices at the location. In another example, the robotic device can be at least semi-autonomous, and the robotic device can perform a task being initiated by the robotic device, without a communication for the task from the control system.

In another example, the task can be initiated by the robotic device and can include a computer local to the robotic device communicating and collaborating with the cloud server resulting in the updated policy. The computer local to the robotic device can initiate the task based on the updated policy, and the robotic device can perform the task in response to the computer local to the robotic device.

In another example, the computer local to the robotic device can initiate the task using AI analysis of data provided by the sensor array at the location, and the sensor array can include environmental data at the location. In another example, the task is not initiated in response to the control system. In another example, the environmental data can include an environmental condition. In another example, the threshold for determining quality includes a measured level of electronic noise which is acceptable for quality, and thereby when the received data exceeds the threshold, and the received data is unacceptable in relation to quality. In another example, the location where the robotic device is operating can have low quality electronic wireless communication capabilities, e.g., sub-optimal electronic wireless communication capabilities.

In another example, the cloud server can have increased communication capabilities with the robot at the location in comparison to the control system.

Referring to FIG. 4A, in another embodiment according to the present disclosure a method 400 can continue from block 220 of the method 200 shown in FIG. 2, and the method 400 includes initiating a task or action by the robotic device, including a computer local to the robotic device communicating and collaborating with the cloud server, resulting in the updated policy, as in block 404.

The method 400 includes initiating the task based on the updated policy using the computer local to the robotic device, as in block 406. The method includes the robotic device performing the task in response to the computer local to the robotic device, as in block 408.

Referring to FIG. 4B, in another embodiment according to the present disclosure a method 450 can continue from block 220 of the method 200 shown in FIG. 2, and the method 450 includes updating the model, using the computer, the updated model includes updating the received data, as in block 454. The method 450 includes updating the analyzing of the data, as in block 456. The method 450 includes secondly communicating with the control system to collaborate in another updating of the policy for choosing navigation action, in response to the updated received data not meeting the threshold for determining quality, as in block 458. The method can further include iteratively updating the updated notification based detecting a change of a parameter of the event.

OTHER EMBODIMENTS AND EXAMPLES

Referring to FIG. 1, the device 130, also can be referred to as a user device or an administrator's device, includes a computer 131 having a processor 132 and a storage medium 134 where an application 135, can be stored. The application can embody the features of the method of the present disclosure as instructions. The user can connect to a learning engine 192 using the device 130. The device 130 which includes the computer 131 and a display or monitor 138. The application 135 can embody the method of the present disclosure and can be stored on the computer readable storage medium 134. The device 130 can further include the processor 132 for executing the application/software 135. The device 130 can communicate with a communications network 160, e.g., the Internet.

It is understood that the user device 130 is representative of similar devices which can be for other users, as representative of such devices, which can include, mobile devices, smart devices, laptop computers etc.

In one example, the system of the present disclosure can include a control system 170 communicating with the user device 130 via a communications network 160. The control system can incorporate all or part of an application or software for implementing the method of the present disclosure. The control system can include a computer readable storage medium 180 where account data and/or registration data 182 can be stored. User profiles 183 can be part of the account data and stored on the storage medium 180. The control system can include a computer 172 having computer readable storage medium 173 and software programs 174 stored therein. A processor 175 can be used to execute or implement the instructions of the software program. The control system can also include a database 176.

In another example and embodiment, profiles can be saved for users/participants. Such profiles can supply data regarding the user and history of deliveries for analysis. In one example, a user can register or create an account using the control system 170 which can include one or more profiles 183 as part of registration and/or account data 182. The registration can include profiles for each user having personalized data. For example, users can register using a website via their computer and GUI (Graphical User Interface) interface. The registration or account data 182 can include profiles 183 for an account 181 for each user. Such accounts can be stored on the control system 170, which can also use the database 176 for data storage. A user and a related account can refer to, for example, a person, or an entity, or a corporate entity, or a corporate department, or another machine such as an entity for automation such as a system using, in all or in part, artificial intelligence.

Additionally, the method and system is discussed with reference to FIG. 3, which is a functional system 300 which includes components and operations for embodiments according to the present disclosure, and is used herein for reference when describing the operational steps of the methods and systems of the present disclosure. Additionally, the functional system 300, according to an embodiment of the present disclosure, depicts functional operations indicative of the embodiments discussed herein.

Referring to FIG. 3, in one embodiment according to the present disclosure, a system 300 can be used to identify objects related to an event for use regarding the event by using networked computer system resources. In FIG. 3 similar components may have the same reference numerals as the system 100 shown in FIG. 1, the system 300 can include or operate in concert with a computer implemented method as shown in FIGS. 1 and 2.

MORE EMBODIMENTS AND EXAMPLES

Figure 5:
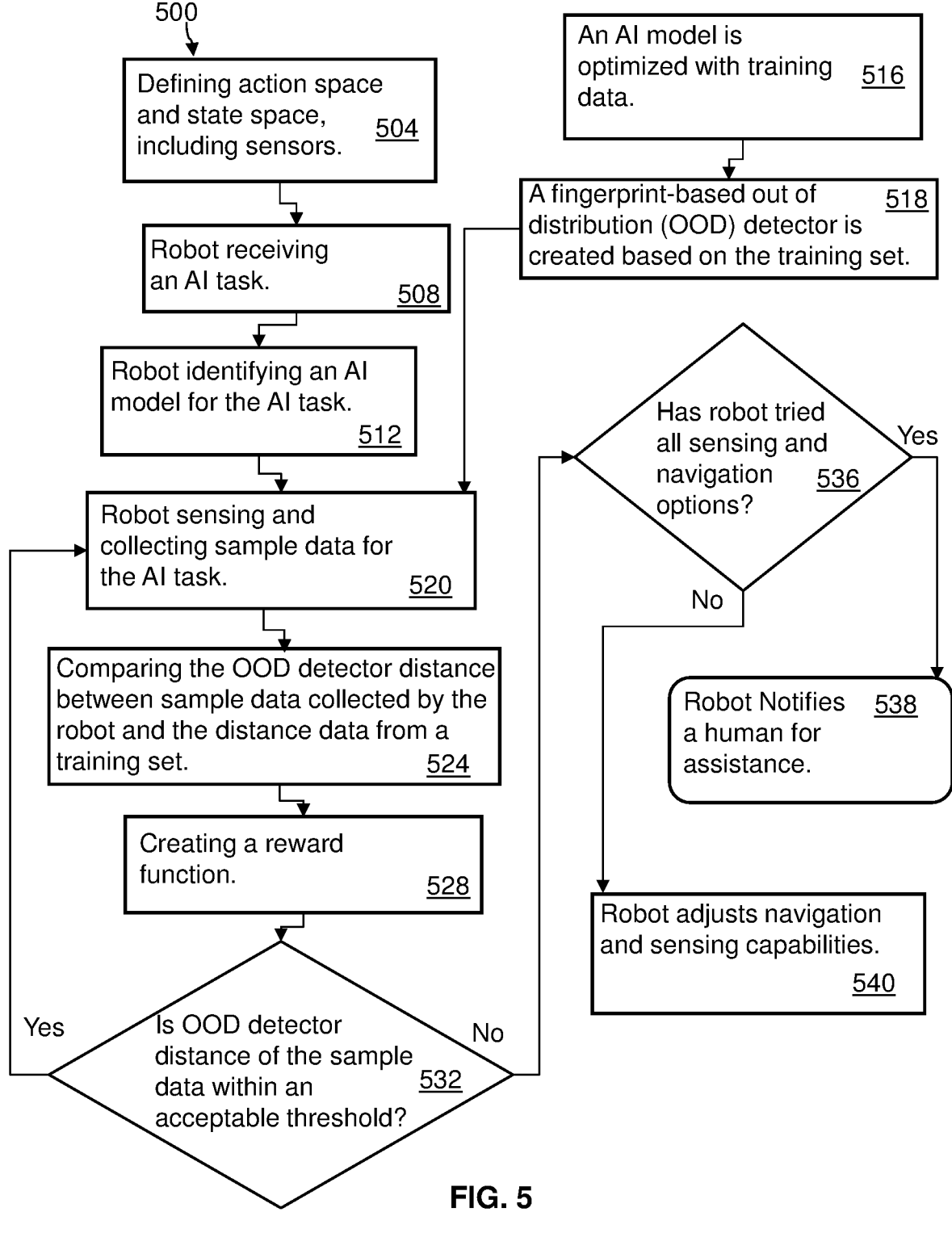
FIG. 5 is a flow chart illustrating another method and system according to an embodiment of the present invention, for optimizing sensing capabilities of a roaming robotic device using Artificial Intelligence (AI).

Generally referring to FIG. 5, in one embodiment according to the present disclosure, a system and method 500 can be used for optimizing sensing capabilities of a roaming robotic device using Artificial Intelligence (AI). The method and system includes AI enabled adaptive navigation for enhancing task performance for an autonomous roaming robotic device, and more specifically, optimizing sensing capabilities for a mobile robotic device, e.g., a roaming edge device (RED).

Methods and system according to the present disclosure can reduce noise and variability in sensed information caused by the dynamic nature of the operational environment, such as introduced by the physical navigation of a RED carrying the sensors. Present methods and system can account for the position and orientation of objects in an environment changing over time, and changes in operational status of equipment in the environment by enhancing quality of sensed information. The methods and systems can account for variations in the environment being sensed and dynamical adjusting the navigation of a RED to optimize the sensing quality. In one example, a method of online reinforcement learning is combined with a versatile outlier detection method as a reward function to address the challenges identified above. The action and state space can be pre-defined based on the navigational and sensing capabilities of the RED. However, the reward function may not be local to the RED and is in the control of the edge or the cloud server where the AI task is deployed. For example, if the RED is a mobile robot, the action space can include movement in a 3-D (three dimensional) environment, a change in pose, or a configuration of each of the sensors. The state space can include a vector representation of the sensed inputs across the sensor array, e.g., optical camera, thermal camera, microphones, and determining ranges by targeting an object with a laser and measuring the time for the reflected light to return. Given a specific AI task, e.g., inspecting a fire extinguisher, a reward function could be defined to correspond to the quality of the sensed state, e.g., whether or not a fire extinguisher is visible in the optical camera. One approach to defining the reward function that works across a variety of AI tasks is based on the likelihood that a given sensed state is out-of-distribution for the AI pipeline for the AI task. A reward function can include a reinforcement of what the AI task should accomplish. A reward function provides guidance to the robot, for example, whether an AI task is completed with satisfactory result or whether it needs to be adjusted to improve the quality. In another embodiment, after multiple trials of achieving a better reward function, the robot has the option to notify a human for assistance when the robot fails to improve the sensing quality.

Referring to FIG. 5, in one example, a method and system according to the present disclosure can include an AI system and method 500 including defining an action space and state space which include sensors, as in block 504. For example, given a specific RED, the action space and the state space are defined to include all sensors and navigation capabilities available to the RED.

The method 500 includes a robot or RED receiving an AI task, at block 508. One or more AI tasks can be defined, and each can include features that are expected, model architectures, and training and inference algorithms.

The method includes the robot identifying an AI model for the AI task, as in block 512. Given training data collected for the AI task, an AI pipeline is trained that may include one or more machine learning models.

The method also includes an AI model being optimized with training data, as in block 516. A fingerprint based out of distribution (OOD) detector can be created based on the training set, as in block 518.

The method includes the robot sensing and collecting sample data for the AI task, as in block 520.

The method includes comparing the OOD detector distance or distance measurement between sample data collected by the robot and the distance data from a training set, as in block 524. For each machine learning model, a fingerprint-based out-of-distribution (OOD) detector can be created from the same training data as that used to train the model. The detector produces a distance measurement between an input sample and the distribution of samples in the training set.

The method includes creating a rewards function, as in block 528. A reward function based on the OOD detector distance and a policy for choosing the next navigation action can be created. An agent that can communicate with the edge or a cloud server is deployed on the RED and the AI pipeline along with the reward function and policy learning are deployed on the edge or cloud server. A standard mission of navigation and sensing tasks can be recorded on the RED and replayed. During mission replay, the agent deployed on the RED can send the sensor data along with action taken to the edge/cloud server. The agent on the RED may optionally compute a feature projection on the data and send it to the edge/cloud server. The AI pipeline in the edge/cloud server can evaluate the quality of the sensor data based on the OOD detector, in one example, when the sensor data is used to make predictions using the AI pipeline.

The method includes determining when an OOD detector distance of a sample data within an acceptable threshold, as in block 532. When the acceptable threshold at block 532 is met the method returns to block 520. When the acceptable threshold at block 532 is not met, the method proceeds to block 536 which includes determining when the robot tried all sensing and navigation options. When the robot has tried all sensing and navigation options at block 536, the method can proceed to the robot notifying a human for assistance at block 538. When all sensing and navigation options have not been tried, the method can proceed to the robot adjusting navigation and sensing capabilities, as in block 540, for example, cooperatively communicating with a cloud server which is accessible for collaboration.

Further, if the input is found to be OOD beyond a threshold, navigation actions are generated via the current policy. The RED and edge/cloud server can collaborate in updating the policy, as in block 540, until the sensor data is of acceptable quality. In another example, a maximum number of trials can be defined for the RED. If the RED fails to improve the sensing quality, it can notify a human to ask for assistance, as in block 538, or it can make specific request to improve the environmental conditions of where the sensing occurs.

Thereby, a method and system can provide adaptive navigation to optimize the quality of sensed information which includes an AI pipeline that is designed to accomplish a specific machine learning task. A task-agnostic reinforcement learning algorithm can have state and action spaces defined on the RED sensors and navigation capabilities. The reward function can be based on the distance of a sensor state from the training distribution, and the policy function that is learned via a reinforcement learning technique. A pre-defined mission can be executed by the RED with a local agent transmitting the sensor state to an edge/cloud server. The edge/cloud server can evaluate the quality of the sensor state based on an OOD detector, and if found to be OOD, then can update the policy and select a next navigation action to be executed by the agent and communicates it to the agent on RED. The agent on the RED can receive the next navigation action from edge/cloud server and execute it until the sample is found to be acceptable for the AI task.

MORE EXAMPLES AND EMBODIMENTS

Operational blocks and system components shown in one or more of the figures may be similar to operational blocks and system components in other figures. The diversity of operational blocks and system components depict example embodiments and aspects according to the present disclosure. For example, methods shown are intended as example embodiments which can include aspects/operations shown and discussed previously in the present disclosure, and in one example, continuing from a previous method shown in another flow chart.

ADDITIONAL EXAMPLES AND EMBODIMENTS

Figure 6:
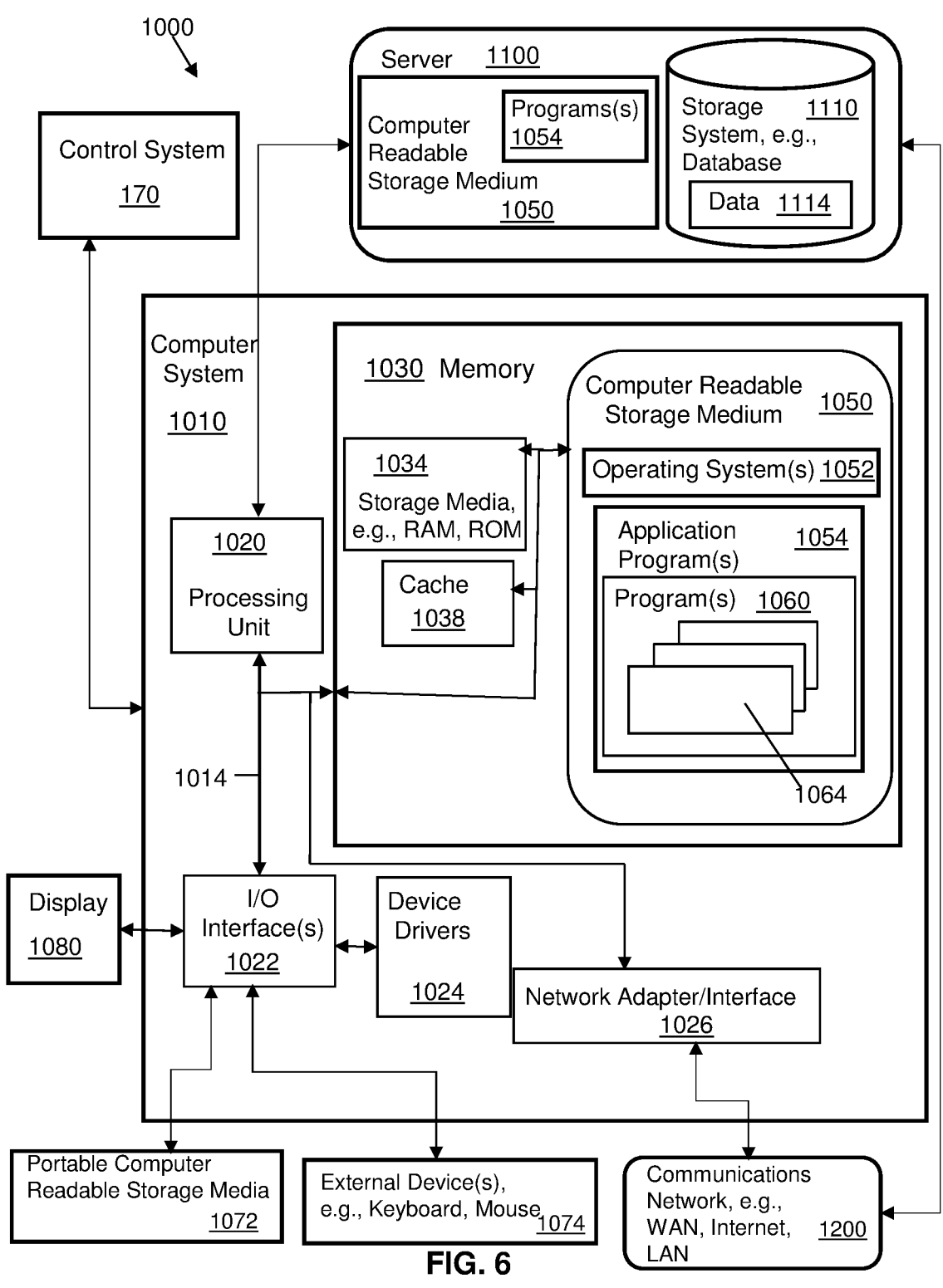
FIG. 6 is a schematic block diagram depicting a computer system according to an embodiment of the disclosure which may be incorporated, all or in part, in one or more computers or devices shown in FIG. 1, and cooperates with the systems and methods shown in the FIGS.

In the embodiment of the present disclosure shown in FIGS. 1 and 2, a computer can be part of a remote computer or a remote server, for example, remote server 1100 (FIG. 6). In another example, the computer 131 can be part of a control system 170 and provide execution of the functions of the present disclosure. In another embodiment, a computer can be part of a mobile device and provide execution of the functions of the present disclosure. In still another embodiment, parts of the execution of functions of the present disclosure can be shared between the control system computer and the mobile device computer, for example, the control system function as a back end of a program or programs embodying the present disclosure and the mobile device computer functioning as a front end of the program or programs.

The computer can be part of the mobile device, or a remote computer communicating with the mobile device. In another example, a mobile device and a remote computer can work in combination to implement the method of the present disclosure using stored program code or instructions to execute the features of the method(s) described herein. In one example, the device 130 can include a computer 131 having a processor 132 and a storage medium 134 which stores an application 135, and the computer includes a display 138. The application can incorporate program instructions for executing the features of the present disclosure using the processor 132. In another example, the mobile device application or computer software can have program instructions executable for a front end of a software application incorporating the features of the method of the present disclosure in program instructions, while a back end program or programs 174, of the software application, stored on the computer 172 of the control system 170 communicates with the mobile device computer and executes other features of the method. The control system 170 and the device (e.g., mobile device or computer) 130 can communicate using a communications network 160, for example, the Internet.

Thereby, the method 100 according to an embodiment of the present disclosure, can be incorporated in one or more computer programs or an application 135 stored on an electronic storage medium 134, and executable by the processor 132, as part of the computer on mobile device. For example, a mobile device can communicate with the control system 170, and in another example, a device such as a video feed device can communicate directly with the control system 170. Other users (not shown) may have similar mobile devices which communicate with the control system similarly. The application can be stored, all or in part, on a computer or a computer in a mobile device and at a control system communicating with the mobile device, for example, using the communications network 160, such as the Internet. It is envisioned that the application can access all or part of program instructions to implement the method of the present disclosure. The program or application can communicate with a remote computer system via a communications network 160 (e.g., the Internet) and access data, and cooperate with program(s) stored on the remote computer system. Such interactions and mechanisms are described in further detail herein and referred to regarding components of a computer system, such as computer readable storage media, which are shown in one embodiment in FIG. 6 and described in more detail in regards thereto referring to one or more computer systems 1010.

Thus, in one example, a control system 170 is in communication with the computer 131 or device 130, and the computer can include the application or software 135. The computer 131, or a computer in a mobile device 130 communicates with the control system 170 using the communications network 160.

In another example, the control system 170 can have a front-end computer belonging to one or more users, and a back-end computer embodied as the control system.

Also, referring to FIG. 1, a device 130 can include a computer 131, computer readable storage medium 134, and operating systems, and/or programs, and/or a software application 135, which can include program instructions executable using a processor 132. These features are shown herein in FIG. 1, and other similar components and features are also in an embodiment of a computer system shown in FIG. 6 referring to a computer system 1010, which may include one or more computer components.

The method according to the present disclosure, can include a computer for implementing the features of the method, according to the present disclosure, as part of a control system. In another example, a computer as part of a control system can work in corporation with a mobile device computer in concert with communication system for implementing the features of the method according to the present disclosure. In another example, a computer for implementing the features of the method can be part of a mobile device and thus implement the method locally.

Specifically, regarding the control system 170, a device(s) 130, or in one example devices which can belong to one or more users, can be in communication with the control system 170 via the communications network 160. In the embodiment of the control system shown in FIG. 1, the control system 170 includes a computer 172 communicating with a database 176 and one or more programs 174 stored on a computer readable storage medium 173. In the embodiment of the disclosure shown in FIG. 1, the device 130 communicates with the control system 170 and the one or more programs 174 stored on a computer readable storage medium 173. The control system includes the computer 172 having a processor 175, which also has access to the database 176.

The control system 170 can include a storage medium 180 for maintaining a registration 182 of users and their devices for analysis of the audio input. Such registration can include user profiles 183, which can include user data supplied by the users in reference to registering and setting-up an account. In an embodiment, the method and system which incorporates the present disclosure includes the control system (generally referred to as the back-end) in combination and cooperation with a front end of the method and system, which can be the application 135. In one example, the application 135 is stored on a device, for example, a computer or device on location, and can access data and additional programs at a back end of the application, e.g., control system 170.

The control system can also be part of a software application implementation, and/or represent a software application having a front-end user part and a back-end part providing functionality. In an embodiment, the method and system which incorporates the present disclosure includes the control system (which can be generally referred to as the back-end of the software application which incorporates a part of the method and system of an embodiment of the present application) in combination and cooperation with a front end of the software application incorporating another part of the method and system of the present application at the device, as in the example shown in FIG. 1 of a device 130 and computer 131 having the application 135. The application 135 is stored on the device or computer and can access data and additional programs at the back end of the application, for example, in the program(s) 174 stored in the control system 170.

The program(s) 174 can include, all or in part, a series of executable steps for implementing the method of the present disclosure. A program, incorporating the present method, can be all or in part stored in the computer readable storage medium on the control system or, in all or in part, on a computer or device 130. It is envisioned that the control system 170 can not only store the profile of users, but in one embodiment, can interact with a website for viewing on a display of a device such as a mobile device, or in another example the Internet, and receive user input related to the method and system of the present disclosure. It is understood that FIG. 1 depicts one or more profiles 183, however, the method can include multiple profiles, users, registrations, etc. It is envisioned that a plurality of users or a group of users can register and provide profiles using the control system for use according to the method and system of the present disclosure.

STILL FURTHER EMBODIMENTS AND EXAMPLES

It is understood that the features shown in some of the FIGS., for example block diagrams, are functional representations of features of the present disclosure. Such features are shown in embodiments of the systems and methods of the present disclosure for illustrative purposes to clarify the functionality of features of the present disclosure.

The methods and systems of the present disclosure can include a series of operation blocks for implementing one or more embodiments according to the present disclosure. In some examples, operational blocks of one or more FIGS. may be similar to operational blocks shown in another figure. A method shown in one FIG. may be another example embodiment which can include aspects/operations shown in another FIG. and discussed previously.

ADDITIONAL EMBODIMENTS AND EXAMPLES

Account data, for instance, including profile data related to a user, and any data, personal or otherwise, can be collected and stored, for example, in the control system 170. It is understood that such data collection is done with the knowledge and consent of a user, and stored to preserve privacy, which is discussed in more detail below. Such data can include personal data, and data regarding personal items.

In one example a user can register 182 have an account 181 with a user profile 183 on a control system 170, which is discussed in more detail below. For example, data can be collected using techniques as discussed above, for example, using cameras, and data can be uploaded to a user profile by the user. A user can include, for example, a corporate entity, or department of a business, or a homeowner, or any end user.

Regarding collection of data with respect to the present disclosure, such uploading or generation of profiles is voluntary by the one or more users, and thus initiated by and with the approval of a user. Thereby, a user can opt-in to establishing an account having a profile according to the present disclosure. Similarly, data received by the system or inputted or received as an input is voluntary by one or more users, and thus initiated by and with the approval of the user. Thereby, a user can opt-in to input data according to the present disclosure. Such user approval also includes a user's option to cancel such profile or account, and/or input of data, and thus opt-out, at the user's discretion, of capturing communications and data. Further, any data stored or collected is understood to be intended to be securely stored and unavailable without authorization by the user, and not available to the public and/or unauthorized users. Such stored data is understood to be deleted at the request of the user and deleted in a secure manner. Also, any use of such stored data is understood to be, according to the present disclosure, only with the user's authorization and consent.

In one or more embodiments of the present invention, a user(s) can opt-in or register with a control system, voluntarily providing data and/or information in the process, with the user's consent and authorization, where the data is stored and used in the one or more methods of the present disclosure. Also, a user(s) can register one or more user electronic devices for use with the one or more methods and systems according to the present disclosure. As part of a registration, a user can also identify and authorize access to one or more activities or other systems (e.g., audio and/or video systems). Such opt-in of registration and authorizing collection and/or storage of data is voluntary and a user may request deletion of data (including a profile and/or profile data), un-registering, and/or opt-out of any registration. It is understood that such opting-out includes disposal of all data in a secure manner. A user interface can also allow a user or an individual to remove all their historical data.

OTHER ADDITIONAL EMBODIMENTS AND EXAMPLES

In one example, Artificial Intelligence (AI) can be used, all or in part, for generating a model or a learning model as discussed herein in embodiments of the present disclosure. An Artificial Intelligence (AI) System can include machines, computer, and computer programs which are designed to be intelligent or mirror intelligence. Such systems can include computers executing algorithms. AI can include machine learning and deep learning. For example, deep learning can include neural networks. An AI system can be cloud based, that is, using a cloud-based computing environment having computing resources.

In another example, the control system 170 can be all or part of an Artificial Intelligence (AI) system. For example, the control system can be one or more components of an AI system It is also understood that the method 100 according to an embodiment of the present disclosure, can be incorporated into (Artificial Intelligence) AI devices, components or be part of an AI system, which can communicate with respective AI systems and components, and respective AI system platforms. Thereby, such programs or an application incorporating the method of the present disclosure, as discussed above, can be part of an AI system. In one embodiment according to the present invention, it is envisioned that the control system can communicate with an AI system, or in another example can be part of an AI system. The control system can also represent a software application having a front-end user part and a back-end part providing functionality, which can in one or more examples, interact with, encompass, or be part of larger systems, such as an AI system. In one example, an AI device can be associated with an AI system, which can be all or in part, a control system and/or a content delivery system, and be remote from an AI device. Such an AI system can be represented by one or more servers storing programs on computer readable medium which can communicate with one or more AI devices. The AI system can communicate with the control system, and in one or more embodiments, the control system can be all or part of the AI system or vice versa.

It is understood that as discussed herein, a download or downloadable data can be initiated using a voice command or using a mouse, touch screen, etc. In such examples a mobile device can be user initiated, or an AI device can be used with consent and permission of users. Other examples of AI devices include devices which include a microphone, speaker, and can access a cellular network or mobile network, a communications network, or the Internet, for example, a vehicle having a computer and having cellular or satellite communications, or in another example, IoT (Internet of Things) devices, such as appliances, having cellular network or Internet access.

FURTHER DISCUSSION REGARDING EXAMPLES AND EMBODIMENTS

It is understood that a set or group is a collection of distinct objects or elements. The objects or elements that make up a set or group can be anything, for example, numbers, letters of the alphabet, other sets, a number of people or users, and so on. It is further understood that a set or group can be one element, for example, one thing or a number, in other words, a set of one element, for example, one or more users or people or participants. It is also understood that machine and device are used interchangeable herein to refer to machine or devices in one or more AI ecosystems or environments.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Such examples are intended to be examples or exemplary, and non-exhaustive. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

FURTHER ADDITIONAL EXAMPLES AND EMBODIMENTS

Referring to FIG. 6, an embodiment of system or computer environment 1000, according to the present disclosure, includes a computer system 1010 shown in the form of a generic computing device. The method 100, for example, may be embodied in a program 1060, including program instructions, embodied on a computer readable storage device, or a computer readable storage medium, for example, generally referred to as computer memory 1030 and more specifically, computer readable storage medium 1050. Such memory and/or computer readable storage media includes non-volatile memory or non-volatile storage, also known and referred to non-transient computer readable storage media, or non-transitory computer readable storage media. For example, such non-volatile memory can also be disk storage devices, including one or more hard drives. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that a control system 170, communicating with a computer system, can include all or part of the computer system 1010 and its components, and/or the control system can communicate with all or part of the computer system 1010 and its components as a remote computer system, to achieve the control system functions described in the present disclosure. The control system function, for example, can include storing, processing, and executing software instructions to perform the functions of the present disclosure. It is also understood that the one or more computers or computer systems shown in FIG. 1 similarly can include all or part of the computer system 1010 and its components, and/or the one or more computers can communicate with all or part of the computer system 1010 and its components as a remote computer system, to achieve the computer functions described in the present disclosure.

In an embodiment according to the present disclosure, one or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions. For example, in one embedment according to the present disclosure, a program embodying a method is embodied in, or encoded in, a computer readable storage medium, which includes and is defined as, a non-transient or non-transitory computer readable storage medium. Thus, embodiments or examples according to the present disclosure, of a computer readable storage medium do not include a signal, and embodiments can include one or more non-transient or non-transitory computer readable storage mediums. Thereby, in one example, a program can be recorded on a computer readable storage medium and become structurally and functionally interrelated to the medium.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

STILL FURTHER ADDITIONAL EXAMPLES AND EMBODIMENTS

Figure 7:
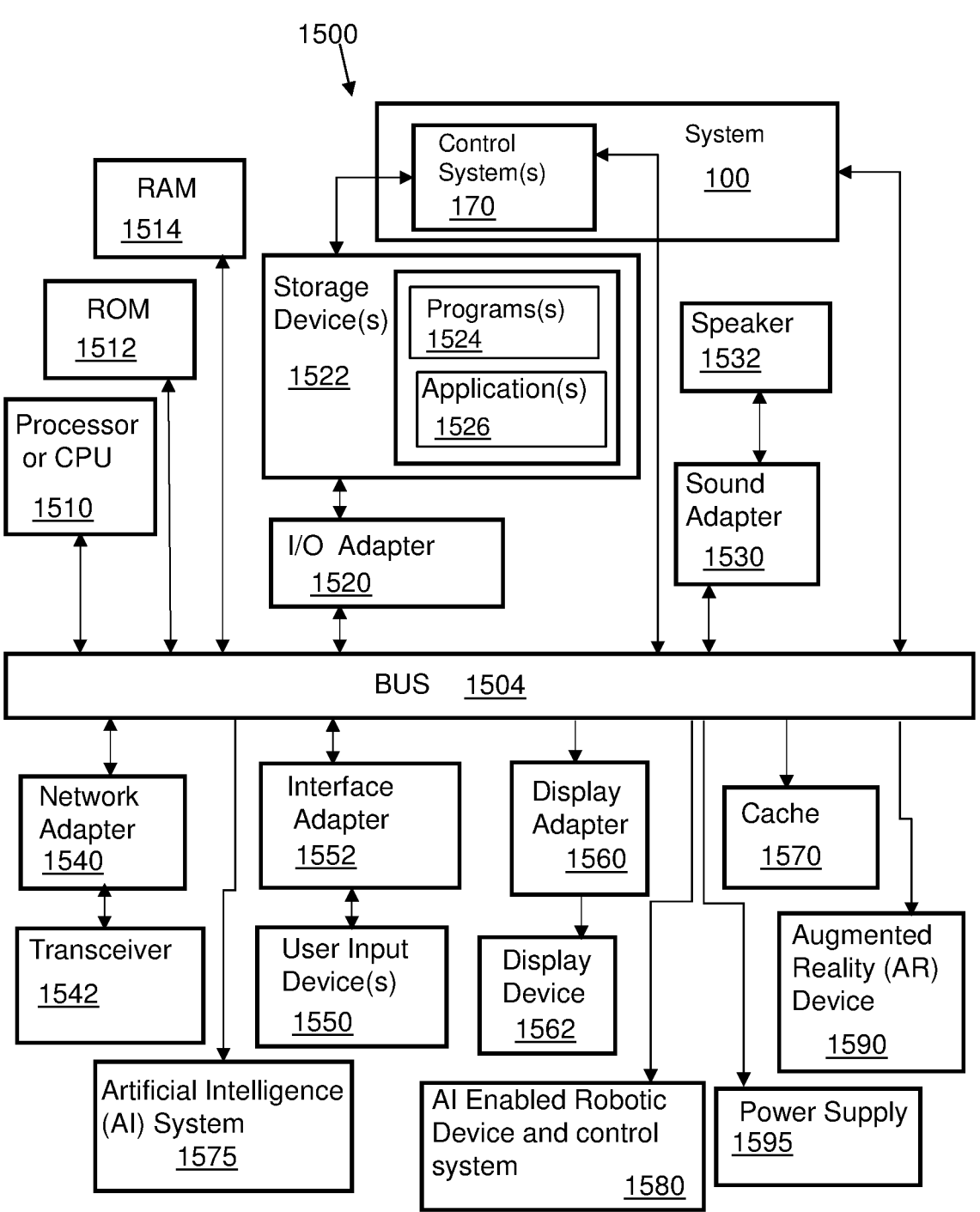
FIG. 7 is a schematic block diagram of a system depicting system components interconnected using a bus. The components for use, in all or in part, with the embodiments of the present disclosure, in accordance with one or more embodiments of the present disclosure.

Referring to FIG. 7, an example system 1500 for use with the embodiments of the present disclosure is depicted. The system 1500 includes a plurality of components and elements connected via a system bus 1504. At least one processor (CPU) 1510, is connected to other components via the system bus 1504. A cache 1570, a Read Only Memory (ROM) 1512, a Random Access Memory (RAM) 1514, an input/output (I/O) adapter 1520, a sound adapter 1530, a network adapter 1540, a user interface adapter 1552, a display adapter 1560 and a display device 1562, are also operatively coupled to the system bus 1504 of the system 1500. An AR device 1580 can also be operatively coupled to the bus 1504. An AI enabled robotic device and control system 1580 can also be operatively coupled to the bus 1504. Such a robot and control system 1580 can incorporate all or part of embodiments of the present disclosure and discussed hereinbefore. An artificial intelligence (AI) system 1575 or an AI ecosystem can also be operatively coupled to the bus 1504. A power supply 1595 can also be operatively connected to the bus 1504 for providing power to components and for functions according to the present disclosure. An augmented reality (AR) device 1590 can also be operatively connected to the bus 1504 for providing augmented reality output to a wearable augmented reality device, such as AR glasses or an AR headset.

One or more storage devices 1522 are operatively coupled to the system bus 1504 by the I/O adapter 1520. The storage device 1522, for example, can be any of a disk storage device (e.g., a magnetic or optical disk storage device), a solid state magnetic device, and so forth. The storage device 1522 can be the same type of storage device or different types of storage devices. The storage device can include, for example, but not limited to, a hard drive or flash memory and be used to store one or more programs 1524 or applications 1526. The programs and applications are shown as generic components and are executable using the processor 1510. The program 1524 and/or application 1526 can include all of, or part of, programs or applications discussed in the present disclosure, as well vice versa, that is, the program 1524 and the application 1526 can be part of other applications or program discussed in the present disclosure.

The system 1500 can include the control system 170 which is part of the system 100 (described in further detail hereinbefore) and can communicate with the system bus independently or as part of the system 100, and thus can communicate with the other components of the system 1500 via the system bus. In one example, the storage device 1522, via the system bus, can communicate with the control system 170 which has various functions as described in the present disclosure.

In one aspect, a speaker 1532 is operatively coupled to system bus 1504 by the sound adapter 1530. A transceiver 1542 is operatively coupled to system bus 1504 by the network adapter 1540. A display 1562 is operatively coupled to the system bus 1504 by the display adapter 1560.

In another aspect, one or more user input devices 1550 are operatively coupled to the system bus 1504 by the user interface adapter 1552. The user input devices 1550 can be, for example, any of a keyboard, a mouse, a keypad, an image capture device, a motion sensing device, a microphone, a device incorporating the functionality of at least two of the preceding devices, and so forth. Other types of input devices can also be used, while maintaining the spirit of the present invention. The user input devices 1550 can be the same type of user input device or different types of user input devices. The user input devices 1550 are used to input and output information to and from the system 1500.

OTHER ASPECTS AND EXAMPLES

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

ADDITIONAL ASPECTS AND EXAMPLES

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
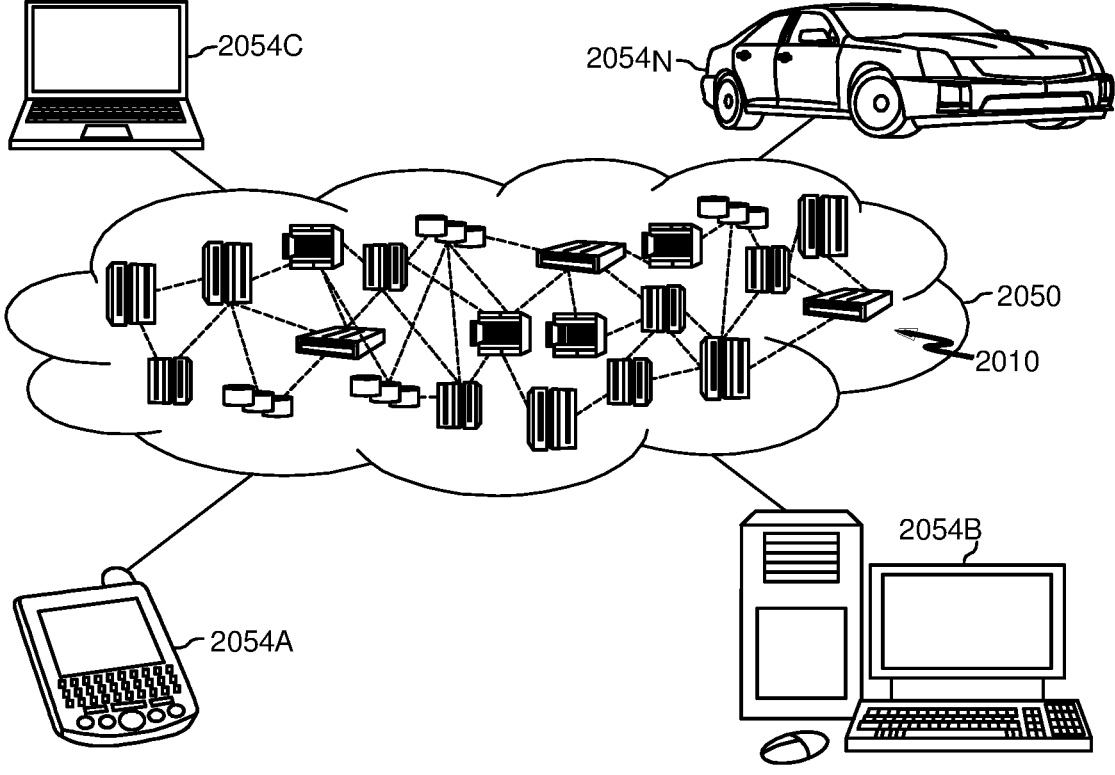
FIG. 8 is a block diagram depicting a cloud computing environment according to an embodiment of the present invention.

Referring now to FIG. 8, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 8 are intended to be illustrative only and that computing nodes 2010 and cloud computing environment 2050 can communicate with any type of computerized device over any type of network and/or network addressable connection (e.g., using a web browser).

Figure 9:
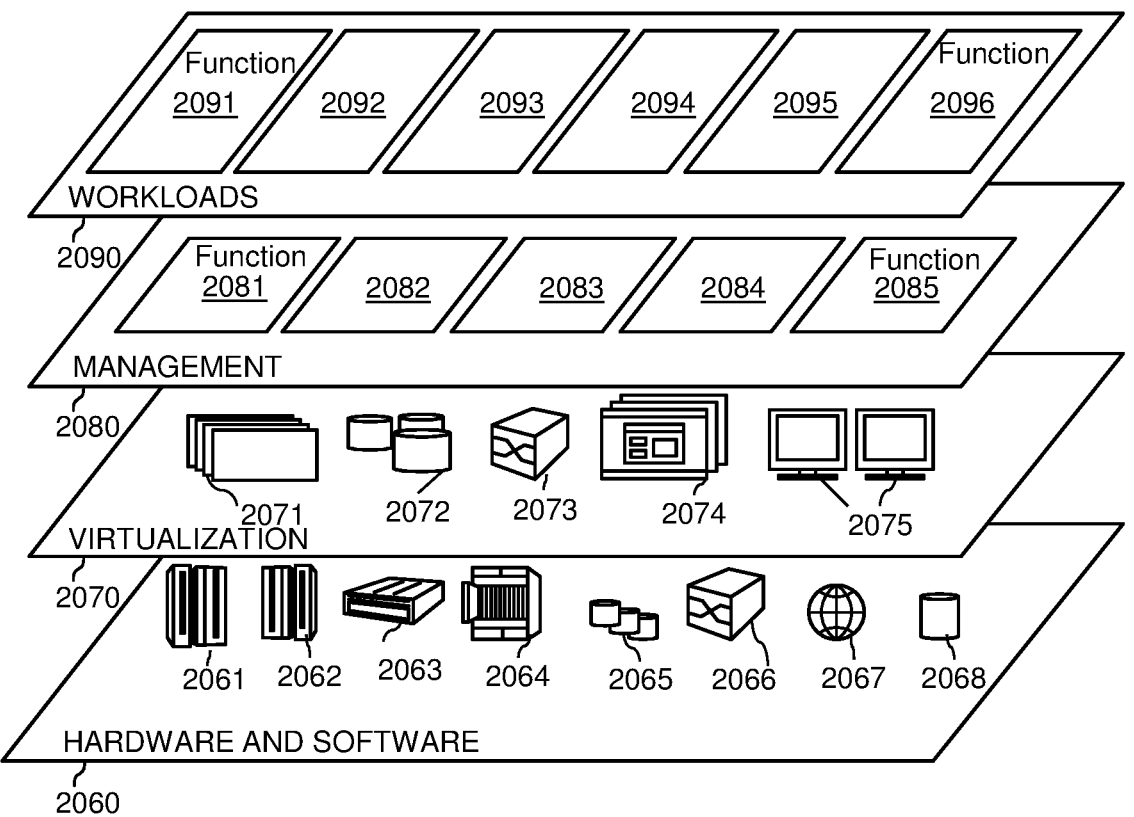
FIG. 9 is a block diagram depicting abstraction model layers according to an embodiment of the present invention.

Referring now to FIG. 9, a set of functional abstraction layers provided by cloud computing environment 2050 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and managing an artificial intelligence enabled robotic device 2096, for example, managing a roaming robotic device using a control system.

What is claimed is:

1. A computer-implemented method for optimizing sensing capabilities of a roaming robotic device, comprising:

receiving data, at a control system having a computer, from a robotic device, the robotic device operating at a site using a policy received from the control system, the policy includes operating actions for the robotic device, the data being generated from sensors on the robotic device in response to a sensing task being performed by the robotic device;

analyzing the received data using the control system for determining when the received data meets a threshold for determining quality of the data, in response to the receiving of the data from the robotic device at the site;

the analysis including generating a model based on a sample set of data, the analysis also including vector representation of the received data as input data, and the analysis includes comparing the vector representation to the model;

determining when the received data does not meet the threshold for determining quality based on the analysis including the comparing of the vector representation of the input data to the model;

in response to the received data at the control system not meeting the threshold for determining quality, the robotic device communicating with an edge server, the edge server evaluating quality of the received data and determining that the quality of the received data does not meet the threshold, and the edge server and the robotic device collaborating in updating the policy to choose a next action, until the received data at the control system meets the threshold; and communicating the next action from the edge server to the robotic device.

2. The method of claim 1, wherein the next action includes a navigation action including the robotic device moving to a next location in the site and initiating additional data collection by the robotic device for the sensing task.

3. The method of claim 1, wherein the next action includes the robotic device adjusting a camera on the robotic device.

4. The method of claim 1, wherein the next action is selected from a group consisting of: moving to a next location; adjusting a camera on the robotic device; adjusting a sensor on the robotic device; and waiting for a period of time.

5. The method of claim 1, further comprising:

creating an out of distribution detector (OOD) from the sample set of data to determine a distance between a distribution of data in the sample set of data, and the input data; and using the distance in the determining when the received data does not meet the threshold for determining quality.

6. The method of claim 1, wherein the robotic device is a roaming edge device (RED) located at an edge of communications for roaming edge devices at the site.

7. The method of claim 1, wherein the threshold for determining quality includes a measured level of electronic noise which is acceptable for quality and thereby when the received data exceeds the threshold, the received data is unacceptable in relation to quality.

8. The method of claim 1, further comprising:

updating the model, using the computer; the updated model includes the following;

updating the received data;

updating the analyzing of the updated received data; and communicating with the control system to collaborate in another updating of the policy for choosing a navigation action, in response to the updated received data not meeting the threshold for determining quality.

9. The method of claim 8, further comprising:

iteratively generating the model to produce updated models.

10. The method of claim 1, wherein the site where the robotic device is operating has low quality electronic wireless communication capabilities.

11. The method of claim 1, wherein the robotic device communicates with the control system at least in part as a cloud server to collaborate in updating the policy to choose a navigation action, and the cloud server being in communication with the robot at a location.

12. A system using a computer for optimizing sensing capabilities of a roaming robotic device, which comprises:

a computer system comprising; a computer processor, a computer-readable storage medium, and program instructions stored on the computer-readable storage medium being executable by the processor, to cause the computer system to perform the following functions to;

receive data, at a control system having a computer, from a robotic device, the robotic device operating at a site using a policy received from the control system, the policy includes operating actions for the robotic device, the data being generated from sensors on the robotic device in response to a sensing task being performed by the robotic device;

analyze the received data using the control system for determining when the received data meets a threshold for determining quality of the data, in response to the receiving of the data from the robotic device at the site;

generate a model, as part of the analysis, based on a sample set of data, the analysis also including vector representation of the received data as input data, and the analysis includes comparing the vector representation to the model;

determine when the received data does not meet the threshold for determining quality based on the analysis including the comparing of the vector representation of the input data to the model;

in response to the received data at the control system not meeting the threshold for determining quality, the robotic device communicates with an edge server, the edge server evaluating quality of the received data and determining that the quality of the received data does not meet the threshold, and the edge server and the robotic device collaborate in updating the policy to choose a next action, until the received data at the control system meets the threshold; and communicate the next action from the edge server to the robotic device.

13. The system of claim 12, wherein the next action includes a navigation action including the robotic device moving to a next location in the site and initiating additional data collection by the robotic device for the sensing task.

14. The system of claim 12, wherein the next action includes the robotic device adjusting a camera on the robotic device.

15. The system of claim 12, wherein the next action is selected from a group consisting of: moving to a next location; adjusting a camera on the robotic device; adjusting a sensor on the robotic device; and waiting for a period of time.

16. The system of claim 12, further comprising:

creating an out of distribution detector (OOD) from the sample set of data to determine a distance between a distribution of data in the sample set of data, and the input data; and using the distance in the determining when the received data does not meet the threshold for determining quality.

17. The system of claim 12, wherein the robotic device is a roaming edge device (RED) located at an edge of communications for roaming edge devices at the site.

18. The system of claim 12, wherein the threshold for determining quality includes a measured level of electronic noise which is acceptable for quality and thereby when the received data exceeds the threshold, the received data is unacceptable in relation to quality.

19. A computer program product for optimizing sensing capabilities of a roaming robotic device, the computer program product comprising a computer readable storage medium having program instructions embodied therewith, the program instructions executable by a computer to cause the computer to perform functions, by the computer, comprising the functions to:

receive data, at a control system having a computer, from a robotic device, the robotic device operating at a site using a policy received from the control system, the policy includes operating actions for the robotic device, the data being generated from sensors on the robotic device in response to a sensing task being performed by the robotic device;

analyze the received data using the control system for determining when the received data meets a threshold for determining quality of the data, in response to the receiving of the data from the robotic device at the site;

generate a model, as part of the analysis, based on a sample set of data, the analysis also including vector representation of the received data as input data, and the analysis includes comparing the vector representation of the input data to the model;

determine when the received data does not meet the threshold for determining quality based on the analysis including the comparing of the vector representation to the model;

in response to the received data at the control system not meeting the threshold for determining quality, the robotic device communicates with an edge server, the edge server evaluating quality of the received data and determining that the quality of the received data does not meet the threshold, and the edge server and the robotic device collaborate in updating the policy to choose a next action, until the received data at the control system meets the threshold; and communicating the next action from the edge server to the robotic device.

* * * * *